United States Patent
Chirreddy et al.

(10) Patent No.: US 10,158,569 B2
(45) Date of Patent: Dec. 18, 2018

(54) DYNAMIC ACCESS-POINT LINK AGGREGATION

(71) Applicant: Brocade Communications Systems, Inc., San Jose, CA (US)

(72) Inventors: Venkat Chirreddy, Milpitas, CA (US); Yun Wu, Sunnyvale, CA (US); Gun Li, Shenzhen (CN); Ta-Chien Lin, Mölnlycke (SE); Yong Seok Joo, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/453,689

(22) Filed: Mar. 8, 2017

(65) Prior Publication Data
US 2018/0262428 A1    Sep. 13, 2018

(51) Int. Cl.
*H04W 72/00*    (2009.01)
*H04L 12/741*   (2013.01)
*H04L 29/12*    (2006.01)
*H04L 12/46*    (2006.01)

(52) U.S. Cl.
CPC ........ *H04L 45/745* (2013.01); *H04L 12/4641* (2013.01); *H04L 61/2007* (2013.01); *H04L 61/6022* (2013.01)

(58) Field of Classification Search
USPC ....................................... 455/452.1
See application file for complete search history.

(56) References Cited

U.S. PATENT DOCUMENTS

| | | | |
|---|---|---|---|
| 2014/0146787 A1* | 5/2014 | Cherian | H04W 12/06 370/331 |
| 2014/0369198 A1* | 12/2014 | Rinne | H04W 40/02 370/235 |
| 2017/0142636 A1* | 5/2017 | Joshi | H04W 40/005 |

* cited by examiner

*Primary Examiner* — Amancio Gonzalez
(74) *Attorney, Agent, or Firm* — Stewart M. Wiener; Steven Stupp

(57) ABSTRACT

An access point that provides link aggregation is described. During operation, this access point receives a message that may include a Dynamic Host Configuration Protocol (DHCP) response with an Internet protocol (IP) address of a gateway for an electronic device to access a network and a media access control (MAC) address of the electronic device. Based on the MAC address and/or at least a characteristic of the electronic device (such as a configuration, a capability and/or an operating system of the electronic device), the access point may determine a different IP address of another gateway for the electronic device to access the network. Moreover, the access point may modify the DHCP response by substituting the IP address of the other gateway for the IP address of gateway in a modified DHCP response. Next, the access point provides the modified DHCP response to the electronic device.

20 Claims, 6 Drawing Sheets

DYNAMIC ACCESS-POINT LINK AGGREGATION

BACKGROUND

Field

The described embodiments relate to techniques for communicating information among electronic devices. In particular, the described embodiments relate to techniques for performing link aggregation at an access-point gateway to a network.

Related Art

Many electronic devices communicate with each other in a network (such as the Internet) that includes or is divided into multiple subnets. Electronic devices in a subnet may access the network via one or more gateways or routers. Moreover, the electronic devices in a subnet may be mapped to different gateways in order to avoid overloading any of the gateways (i.e., to perform load balancing or load sharing) and/or to provide redundancy.

For example, in layer-2 networking, load balancing may be implemented using link aggregation in a gateway, such as a switch. In particular, in link aggregation two or more network connections or ports may be aggregated in parallel so that the two or more ports virtually act as a single aggregated port, which has a larger throughput than the constituent connections or ports. Consequently, the aggregated port or link can implement load sharing among the constituent ports. In addition, link aggregation may provide redundancy in the event that one of the constituent or grouped ports fails.

However, link aggregation typically requires the use of protocols, such as link-aggregation control protocol for Ethernet, which is defined in the Institute of Electrical and Electronics Engineers (IEEE) 802.1AX standard. This vendor-specific capability often involves the use of additional or specialized hardware in the network (such as enterprise-grade switches), which usually increases the cost and the complexity of the implementation.

Furthermore, redundancy may also be provided in a level-3 routing-capable switch or router using a first-hop redundancy protocol. In this vendor-specific approach, multiple routers monitor each other and a standby unit may assume active status when an active unit stops working. Once again, this capability often involves the use of additional or specialized hardware in the network.

Because of the additional complexity and expense, link aggregation and/or first-hop redundancy are usually not available in low-end or entry-level systems. This can degrade the user experience when attempting to communicate using such networks.

SUMMARY

The described embodiments relate to an access point that provides link aggregation. This access point includes an interface circuit that communicates with an electronic device in a subnet. During operation, the access point receives a message that includes a Dynamic Host Configuration Protocol (DHCP) response with an Internet protocol (IP) address of a gateway for the electronic device to access a network that includes the subnet and a media access control (MAC) address of the electronic device. Based on the MAC address, the access point determines a different IP address of another gateway for the electronic device to access the network. Moreover, the access point modifies the DHCP response by substituting the IP address of the other gateway for the IP address of gateway in a modified DHCP response. Next, the access point provides the modified DHCP response to the electronic device.

Note the access point may determine the IP address of the other gateway using a hash function or a look-up table. Furthermore, the determination may be based on at least a characteristic of the electronic device. For example, the characteristic may include: a capability of the electronic device, a configuration of the electronic device and/or an operating system of the electronic device.

Additionally, prior to determining the IP address of the other gateway, the access point may identify that the message includes the DHCP response.

Moreover, the access point may provide link aggregation without associating one of the gateway and the other gateway to a virtual local area network (VLAN).

In some embodiments, the access point receives gratuitous Address Resolution Protocol (ARP) packets from another access point, which is a gateway in the subnet, and for which the access point provides preassigned redundancy coverage. Subsequently, if the access point does not receive a gratuitous ARP packet from the other access point within a time interval, the access point may assume an IP address of the other access point, which is in addition to an existing IP address of the access point. Then, in response to receiving an ARP request from the electronic device that includes the IP address of the other access point, the access point may provide an ARP response with a MAC address of the access point, so that subsequent frames from the electronic device are directed to the access point instead of the other access point.

Moreover, the access point may include: a processor; and a memory, coupled to the processor, which stores a program module that, during operation, is executed by the processor. The program module may include instructions for at least some of the operations performed by the access point.

Another embodiment provides an access point that performs one of the link aggregation and the redundancy coverage.

Another embodiment provides a computer-readable storage medium for use with the access point. When executed by the access point, this readable storage medium includes causes the access point to perform at least some of the aforementioned operations.

Another embodiment provides a method, which may be performed by the access point. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
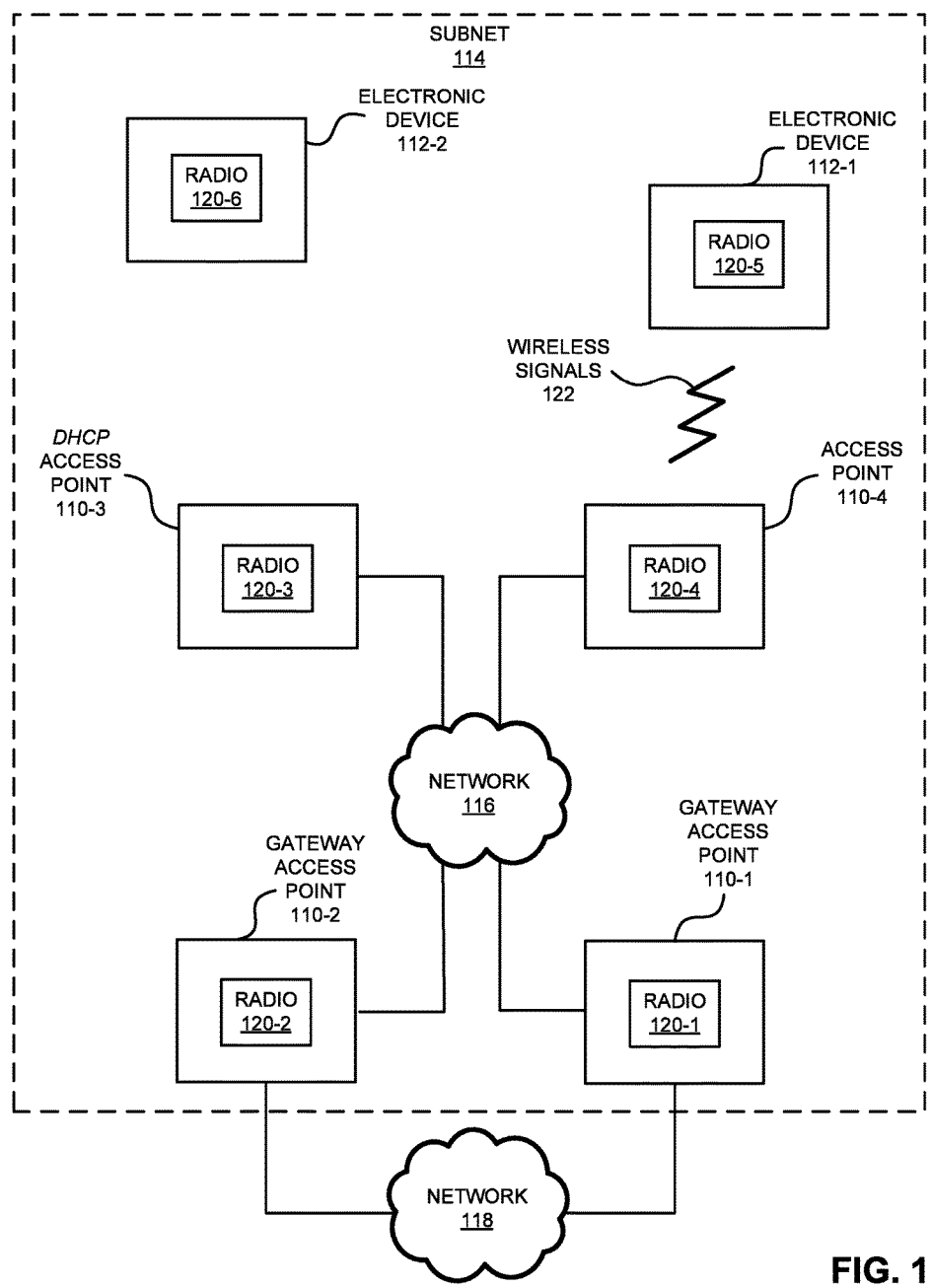
FIG. 1 is a block diagram illustrating communication among access points and electronic devices in a subnet in accordance with an embodiment of the present disclosure.

An access point that provides link aggregation is described. During operation, this access point receives a message that may include a DHCP response with an IP address of a gateway for an electronic device to access a network and a MAC address of the electronic device. Based on the MAC address and/or at least a characteristic of the electronic device (such as a configuration, a capability and/or an operating system of the electronic device), the access point may determine a different IP address of another gateway for the electronic device to access the network. Moreover, the access point may modify the DHCP response by substituting the IP address of the other gateway for the IP address of gateway in a modified DHCP response. Next, the access point provides the modified DHCP response to the electronic device.

Alternatively or additionally, the access point may provide redundancy coverage. In particular, during operation the access point may receive gratuitous ARP packets from another access point, which is a gateway to the network, and for which the access point provides preassigned redundancy coverage. Subsequently, if the access point does not receive a gratuitous ARP packet from the other access point within a time interval, the access point may assume an IP address of the other access point, which is in addition to an existing IP address of the access point. Then, in response to receiving an ARP request from an electronic device that includes the IP address of the other access point, the access point may provide an ARP response with a MAC address of the access point, so that subsequent frames from the electronic device are directed to the access point instead of the other access point.

By providing link aggregation and/or redundancy coverage, this communication technique may provide improved communication performance (such as improved throughput, load balancing and robust communication) without requiring the use of additional or specialized hardware in the network, such as enterprise-grade switches. Consequently, the communication technique may improve the user experience when using the access point and communicating via the network without increasing the cost or the complexity of the network.

In the discussion that follows, the electronic device and the access point communicate packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Moreover, the access point may communicate with other access points and/or computers in the network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among one or more access points 110 and electronic devices 112 (such as a cellular telephone) in a subnet 114 in accordance with some embodiments. In particular, access points 110 may communicate with each other using wireless and/or wired communication. Moreover, at least some of access points 110 may have specific functions in subnet 114, such as: one or more gateway access points (e.g., gateway access points 110-1 and 110-2) that provide access to network 118 (such as the Internet) and/or one or more DHCP access points (e.g., DHCP access point 110-3) that process DHCP requests. Note that access points 110 may include a physical access point and/or a virtual access point that is implemented in software in an environment of an electronic device or a computer. In addition, at least some of access points 110 may communicate with electronic devices 112 using wireless communication.

The wired communication in subnet 114 may occur via network 116 (such as an intra-net, a mesh network, point-to-point connections and/or the Internet) and may use a network communication protocol, such as Ethernet. Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wireless communication among access points 110 also involves the use of dedicated connections, such as via a peer-to-peer (P2P) communication technique.

Figure 6:
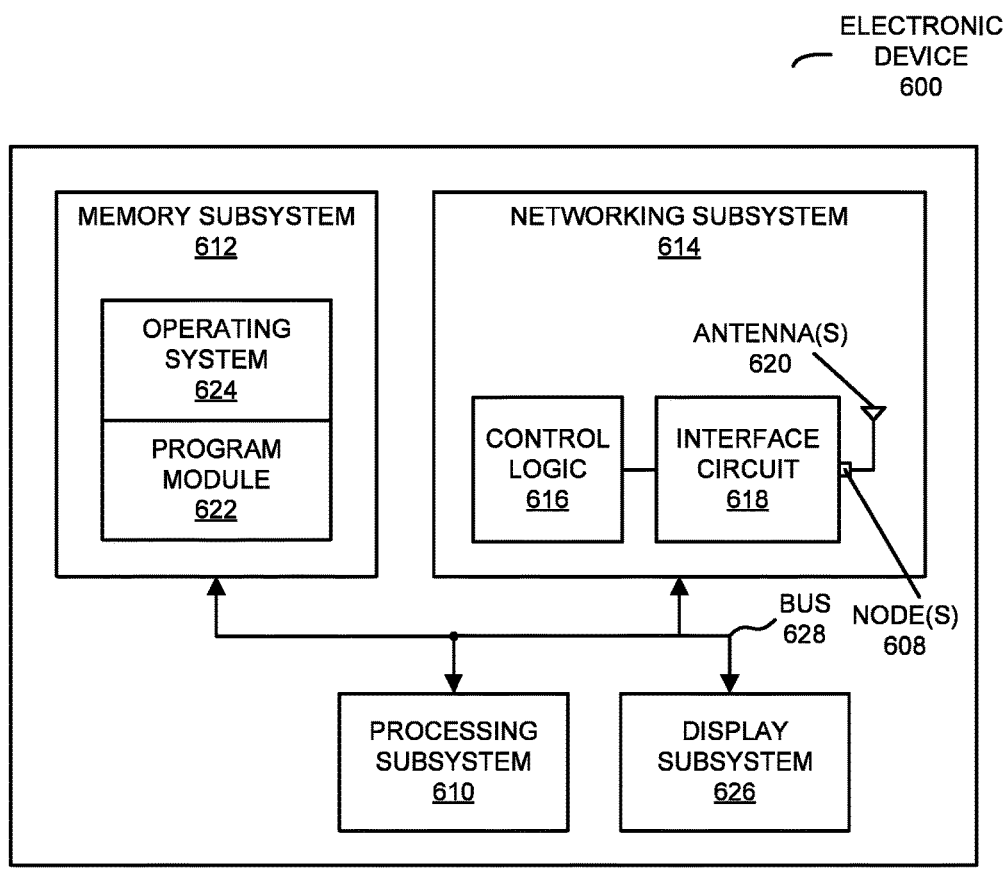
FIG. 6 is a block diagram illustrating an electronic device in accordance with an embodiment of the present disclosure.

As described further below with reference to FIG. 6, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. In particular, access point 110-4 may transmit packets. In turn, these packets may be received by electronic device 112-1. Moreover, access point 110-4 may allow electronic device 112-1 to communicate with other electronic devices, computers and/or servers via networks 116 and/or 118.

Note that the communication among access points 110 and/or with electronic devices 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving wireless signals 122 with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, it can be expensive and complicated to implement link aggregation and/or redundancy coverage in subnet 114. As described further below with reference to FIGS. 2-5, either or both of these capabilities may be provided by one or more of access points 110 using the communication technique. In particular, one of electronic devices (such as electronic device 112-1) may provide a DHCP request to access point 110-4, which forwards the DHCP request via network 116 to one of access points 110 that provide DHCP functionality/processes DHCP requests (such as DHCP access point 110-3), i.e., one of access points 110 may include the functions of a DHCP server, such as assigning IP addresses and/or performing a network address translation. In response, DHCP access point 110-3 may provide a DHCP response to access point 110-4. For example, DHCP access point 110-3 may transmit the DHCP response to access point 110-4 using wired communication. Note that the DHCP response may include an IP address of a gateway for electronic device 112-1 to access network 118 that includes subnet 114 (such as an IP address of gateway access point 110-1) and a MAC address of electronic device 112-1.

After receiving the DHCP response, access point 110-4 may determine a different (real, as opposed to virtual) IP address of another gateway for electronic device 112-1 to access network 118 (such as an IP address of gateway access point 110-2). For example, access point 110-4 may perform a look-up in a predetermined table based on the MAC address of electronic device 112-1. Alternatively or additionally, access point 110-4 may determine the IP address of gateway access point 110-2 based on the MAC address of electronic device 112-1 using a hash function. (In some embodiments, access point 110-4 may determine the IP address of gateway access point 110-2 based on information in one or more fields in a frame or packet header.) More generally, access point 110-4 may determine the IP address of gateway access point 110-2 based at least on a characteristic of electronic device 112-1, such as: a capability of electronic device 112-1 (e.g., a communication capability of electronic device 112-1), a configuration of electronic device 112-1 (e.g., a type or model of electronic device 112-1) and/or an operating system of electronic device 112-1. Thus, the predefined or predetermined reassignment in the look-up table or the hash function may be based at least on the characteristic. Note that there may be a one-to-one mapping of the MAC address of electronic device 112-1 to the IP address of gateway access point 110-2.

Then, access point 110-4 may modify the DHCP response by substituting the IP address of gateway access point 110-2 for the IP address of gateway access point 110-1 in a modified DHCP response. Next, access point 110-4 may provide the modified DHCP response to electronic device 112-1. For example, access point 110-4 may wirelessly transmit one or more frames or packets to electronic device 112-1.

After receiving the modified DHCP response, electronic device 112-1 may transmit, via access point 110-4 and network 116, an ARP request or packet to gateway access point 110-2 with the IP address of gateway access point 110-2. In response, gateway access point 110-2 may transmit, via network 116 and access point 110-4, an ARP response with the MAC address of gateway access point 110-2. Electronic device 112-1 may store the MAC address and/or the IP address of gateway access point 110-2 in an ARP cache.

Subsequently, electronic device 112-1 may include the MAC address and/or the IP address of gateway access point 110-2 in transmitted frames or packets, as well as the destination MAC address and/or IP address. Then, gateway access point 110-2 may handle processing of these frames or packets, such as routing them to destinations on network 118.

In this way, access point 110-4 may perform load balancing or sharing among gateway access points (such as gateway access points 110-1 and 110-2) without requiring the use of expensive, enterprise-grade switches in subnet 114. Moreover, access point 110-4 may provide link aggregation without associating gateway access point 110-1 or 110-2 to a VLAN. Thus, the communication technique may not be restricted to use with VLANs or may not be restricted to having one gateway (such as gateway access point 110-1) associated with one VLAN (i.e., may not be restricted to only having one gateway per VLAN).

Alternatively or additionally, one of access points 110 may provide redundancy coverage in subnet 114. For example, gateway access points 110-1 and 110-2 may provide redundancy coverage or hot stand-by for each other. In particular, gateway access point 110-2 may provide or transmit gratuitous ARP packets to gateway access point 110-1 via network 116.

If gateway access point 110-1 does not receive a gratuitous ARP packet from gateway access point 110-2 within a time interval (such as 1, 5, 10, 30 or 60 s), gateway access point 110-1 may assume the IP address of gateway access point 110-2, which is in addition to an existing IP address of gateway access point 110-1. Thus, in this example, gateway access point 110-1 may have two IP addresses (i.e., gateway access point 110-1 may implement IP aliasing). Stated differently, gateway access point 110-1 may share two logical (IP) addresses, but may have a different physical (MAC) address than (now inactive) gateway access point 110-2.

Subsequently, a frame or packet from electronic device 112-1, which is intended for the (now former) IP address of gateway access point 110-2, may be received, via access point 110-4 and network 116, by gateway access point 110-1. For example, gateway access point 110-1 may employ ARP spoofing or proxy ARP. Because this frame or packet may include the MAC address of gateway access point 110-2, gateway access point 110-1 may transmit, via network 116 and access point 110-4, a message (such as a frame or a packet) to electronic device 112-1 that, in essence, indicates that the MAC address is incorrect or has changed. After receiving this message, electronic device 112-1 may transmit, via access point 110-4 and network 116, an ARP request to gateway access point 110-1 with the (now former) IP address of gateway access point 110-2. In response, gateway access point 110-1 may transmit, via network 116 and access point 110-4, an ARP response (such as a frame or a packet) with a MAC address of gateway access point 110-1. Electronic device 112-1 may store the MAC address of gateway access point 110-1 and/or the (now former) IP address of gateway access point 110-2 in an ARP cache.

Alternatively, when gateway access point 110-1 assumes the IP address of gateway access point 110-2, gateway access point 110-1 may transmit a gratuitous ARP packet to subnet 114, so that electronic device 112-1 can store the MAC address of gateway access point 110-1 and/or the IP address of gateway access point 110-2 in the ARP cache.

Subsequently, electronic device 112-1 may include the MAC address of gateway access point 110-1 and/or the (now former) IP address of gateway access point 110-2 in transmitted frames or packets, as well as the destination MAC address and/or IP address. Then, gateway access point 110-1 may handle processing of these frames or packets, such as routing them to destinations on network 118.

Note that, if gateway access point 110-2 is subsequently active again, this process may be revered. In particular, if gateway access point 110-1 subsequently receives, via network 116, a gratuitous ARP packet from gateway access point 110-2, gateway access point 110-1 may no longer assume the IP address of gateway access point 110-2. Instead, gateway access point 110-2 may once again assume this IP address.

Then, a frame or packet from electronic device 112-1, which is intended for the IP address of gateway access point 110-2, may be received, via access point 110-4 and network 116, by gateway access point 110-2. Because this frame or packet may include the MAC address of gateway access point 110-1, gateway access point 110-2 may transmit, via network 116 and access point 110-4, a message (such as a frame or a packet) to electronic device 112-1 that, in essence, indicates that the MAC address is incorrect or has changed. After receiving this message, electronic device 112-1 may transmit, via access point 110-4 and network 116, an ARP request to gateway access point 110-2 with the IP address of gateway access point 110-2. In response, gateway access point 110-2 may transmit, via network 116 and access point 110-4, an ARP response (such as a frame or a packet) with the MAC address of gateway access point 110-2. Electronic device 112-1 may store the MAC address of gateway access point 110-2 and/or the IP address of gateway access point 110-2 in the ARP cache.

Alternatively, when gateway access point 110-2 reassumes the IP address, gateway access point 110-2 may transmit a gratuitous ARP packet to subnet 114, so that electronic device 112-1 can store the MAC address of gateway access point 110-2 and/or the IP address of gateway access point 110-2 in the ARP cache.

Subsequently, electronic device 112-1 may include the MAC address of gateway access point 110-2 and/or the IP address of gateway access point 110-2 in transmitted frames or packets, as well as the destination MAC address and/or IP address. Then, gateway access point 110-2 may once again handle processing of these frames or packets, such as routing them to destinations on network 118.

In this way, gateway access point 110-1 may provide reversible or dynamic redundancy coverage for gateway access point 110-2 without requiring the use of expensive, enterprise-grade switches in subnet 114.

While FIG. 1 illustrates access points 110 having particular functionality (gateway access points 110-1 and 110-2, DHCP access point 110-3, etc.), in other embodiments some or all of access points 110 may be capable of performing the DHCP function and/or the operations in the communication technique.

Figure 2:
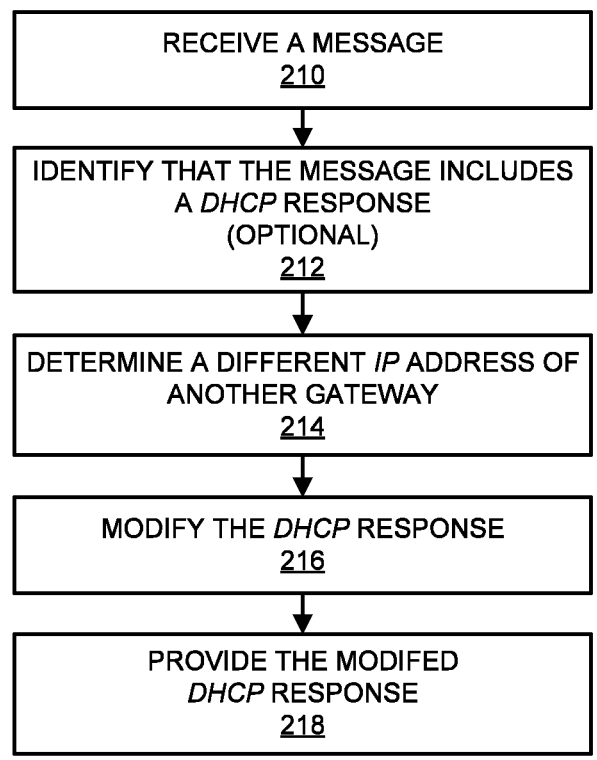
FIG. 2 is a flow diagram illustrating a method for performing link aggregation using an access point in FIG. 1 in accordance with an embodiment of the present disclosure.

We now describe embodiments of the method. FIG. 2 presents a flow diagram illustrating an example of a method 200 for performing link aggregation using an access point, such as one of access points 110 in FIG. 1. During operation, the access point may receive a message (operation 210) that includes a DHCP response with an IP address of a gateway for the electronic device to access a network that includes a subnet with the electronic device and a MAC address of the electronic device.

Based on the MAC address, the access point may determine a different IP address of another gateway (operation 214) for the electronic device to access the network. Note the access point may determine the IP address of the other gateway using a hash function or a look-up table. Furthermore, the determination may be based on at least a characteristic of the electronic device. For example, the characteristic may include: a capability of the electronic device, a configuration of the electronic device and/or an operating system of the electronic device.

Moreover, the access point may modify the DHCP response (operation 216) by substituting the IP address of the other gateway for the IP address of gateway in a modified DHCP response. Next, the access point may provide the modified DHCP response (operation 218) to the electronic device.

In some embodiments, the access point optionally performs one or more additional operations. For example, the access point may optionally identify that the message includes the DHCP response (operation 212).

Figure 3:
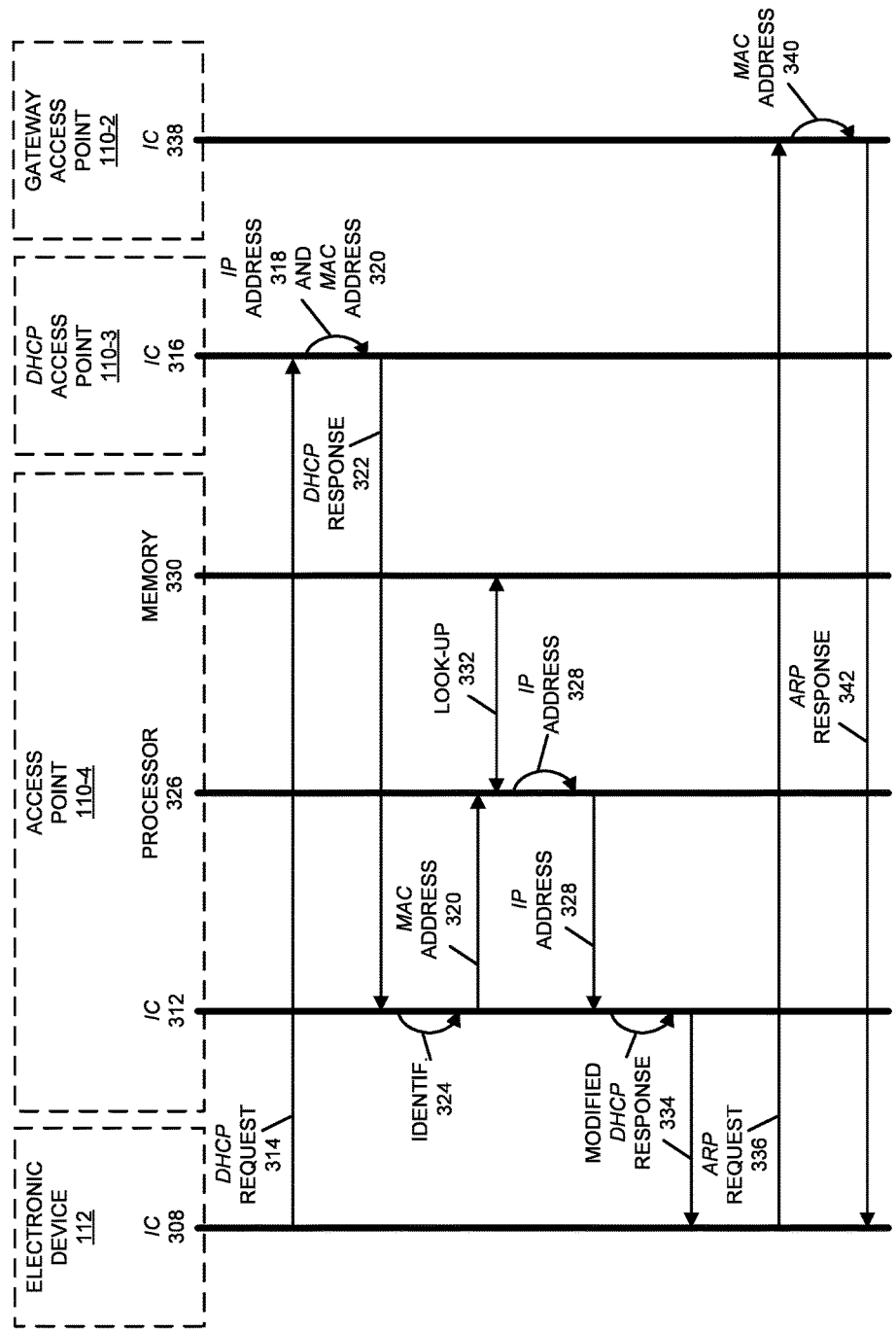
FIG. 3 is a drawing illustrating communication among the electronic devices in FIG. 1 in accordance with an embodiment of the present disclosure.

FIG. 3 presents a drawing illustrating an example of communication among access points 110 and electronic device 112-1. In particular, an interface circuit (IC) 308 in electronic device 112-1 may provide a DHCP request 310 to interface circuit 312 in access point 110-4. Interface circuit 312 may provide DHCP request 310 to interface circuit 316 in DHCP access point 110-3, which provides DHCP functionality/processes DHCP requests (i.e., DHCP access point 110-3 may include the functions of a DHCP server). In response, DHCP access point 110-3 may provide a DHCP response 322 to access point 110-4. Note that DHCP response 322 may include IP address 318 of gateway access point 110-1 (FIG. 1) and a MAC address 320 of electronic device 112-1.

After receiving DHCP response 322, interface circuit 310 may identify 324 that this message is a DHCP response. Then, interface circuit 310 may provide MAC address 320 to processor 326.

Moreover, processor 326 may determine IP address 328 of gateway access point 110-2 based on MAC address 320. For example, processor 326 may perform a look-up 332 in a predetermined table in memory 330 based on MAC address 320. Alternatively or additionally, processor 326 may determine IP address 328 based on MAC address 320 using a hash function.

Next, processor 326 may provide IP address 328 to interface circuit 310. Interface circuit 310 may generate a modified DHCP response 334 that substitutes IP address 328 for IP address 318. Furthermore, interface circuit 310 may provide modified DHCP response 334 to interface circuit 308.

After receiving modified DHCP response 334, interface circuit 308 may transmit, via access point 110-4, an ARP request 336 to interface circuit 338 in gateway access point 110-2 with IP address 328. In response, interface circuit 338 may transmit, via access point 110-4, an ARP response 342 with MAC address 340 of gateway access point 110-2. Electronic device 112-1 may store MAC address 340 and/or IP address 328 in an ARP cache.

Subsequently, interface circuit 308 may include direct communication to gateway access point 110-2 for further processing, such as routing to destinations on network 118 (FIG. 1).

Figure 4:
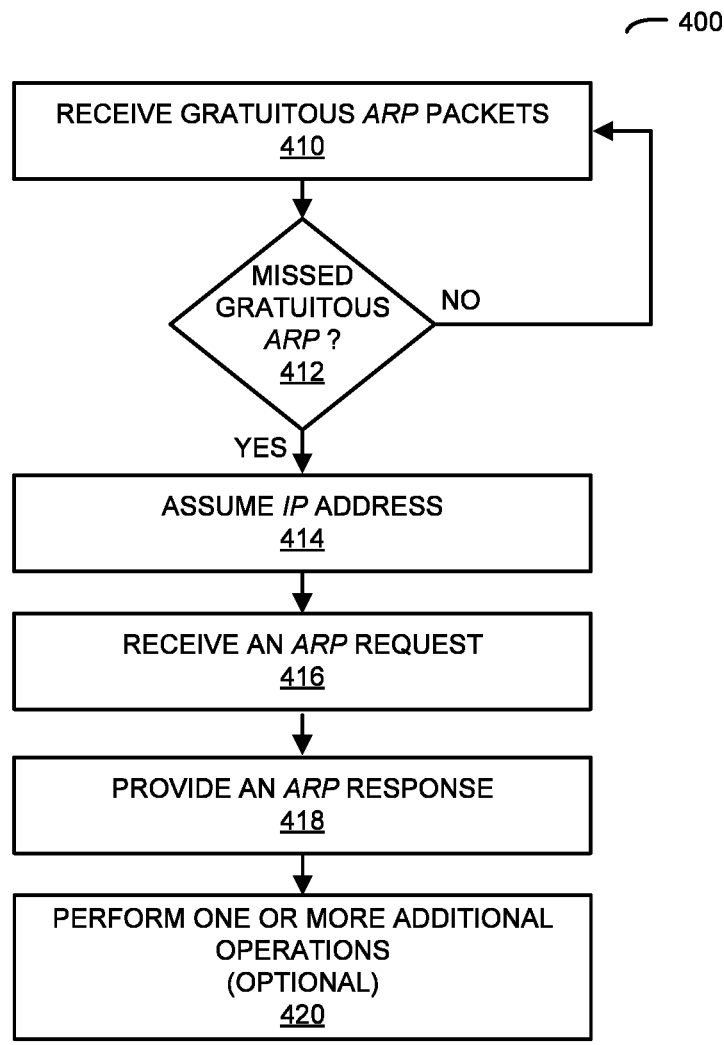
FIG. 4 is a flow diagram illustrating a method for providing redundancy coverage using an access point in FIG. 1 in accordance with an embodiment of the present disclosure.

FIG. 4 presents a flow diagram illustrating an example of a method 400 for providing redundancy coverage using an access point, such as one of access points 110 in FIG. 1. During operation, the access point receives gratuitous ARP packets (operation 410) from another access point, which is a gateway in the subnet, and for which the access point provides preassigned redundancy coverage. If the access point does not receive a gratuitous ARP packet (operation 412) from the other access point within a time interval, the access point may assume an IP address (operation 414) of the other access point, which is in addition to an existing IP address of the access point.

Then, the access point may receive an ARP request (operation 416) from the electronic device that includes the IP address of the other access point. In response, the access point may provide an ARP response with a MAC address of the access point (operation 418), so that subsequent frames from the electronic device are directed to the access point instead of the other access point.

In some embodiments, the access point optionally performs one or more additional operations (operation 420). For example, if the access point subsequently receives a gratuitous ARP packet from the other access point, the access point may no longer assume the IP address of access point. Instead, the other access point may once again assume this IP address.

In some embodiments of methods 200 (FIG. 2) and/or 400, there may be additional or fewer operations. Furthermore, the order of the operations may be changed, and/or two or more operations may be combined into a single operation. For example, while method 400 used ARP as an illustrative example, in other embodiments the messages may be compatible with a different communication protocol.

Figure 5:
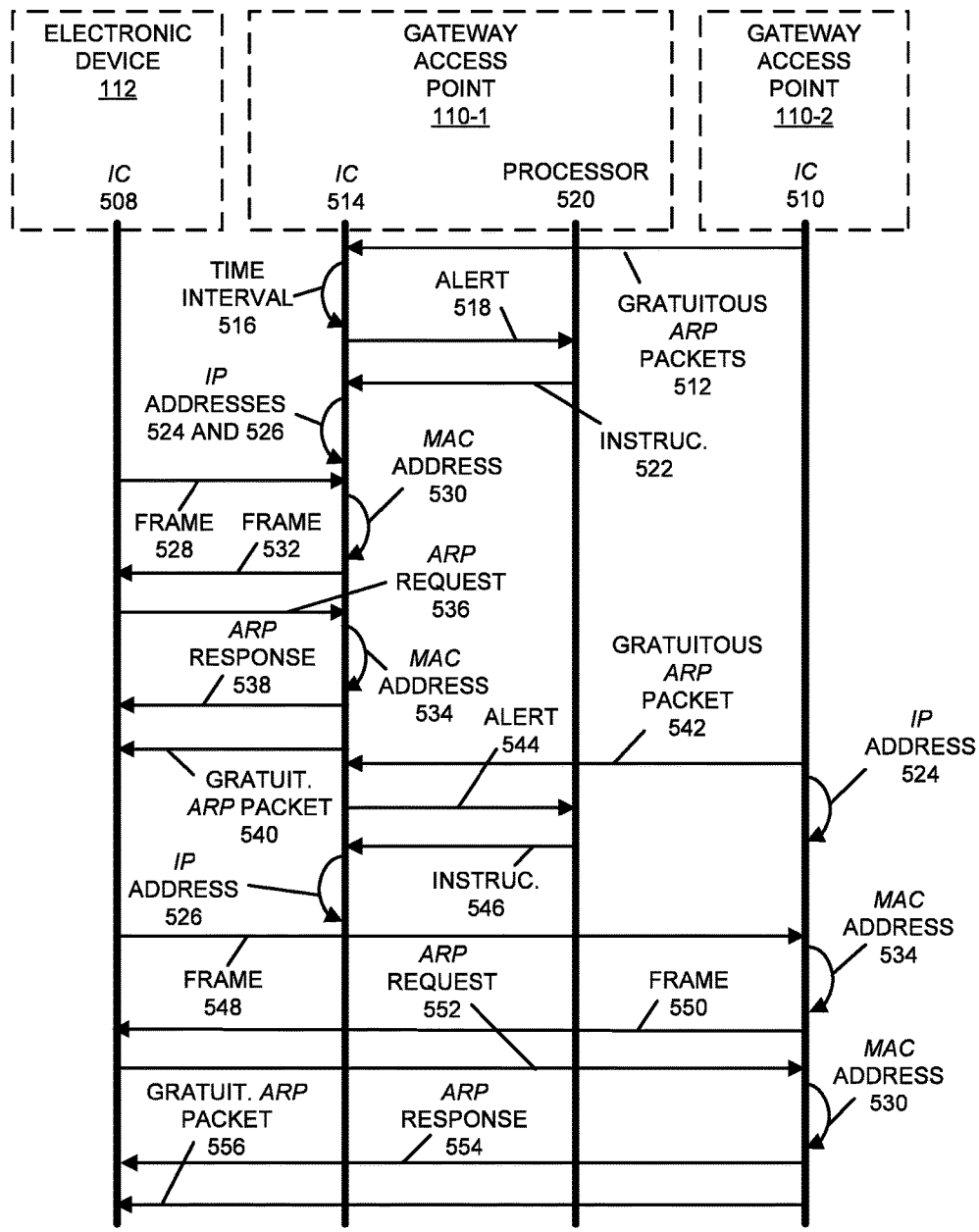
FIG. 5 is a drawing illustrating communication among the electronic devices in FIG. 1 in accordance with an embodiment of the present disclosure.

FIG. 5 presents a drawing illustrating an example of communication among electronic device 112-1 and access points 110. In particular, interface circuit 510 in gateway access point 110-2 may provide gratuitous ARP packets 512 to interface circuit 514 in gateway access point 110-1.

If interface circuit 514 in gateway access point 110-1 does not receive a gratuitous ARP packet from gateway access point 110-2 within a time interval 516 (such as 1, 5, 10, 30 or 60 s), interface circuit may provide alert 518 to processor 520 in gateway access point 110-1. In response, processor 520 may instruct 522 interface circuit 514 to assume IP address 524 of gateway access point 110-2, which is in addition to an existing IP address 526 of gateway access point 110-1.

Subsequently, interface circuit 508 in electronic device 112-1 may transmit a frame (or packet) 528 to IP address 524 (and, thus, to gateway access point 110-1, which may employ ARP spoofing or proxy ARP). After receiving frame 528, interface circuit 514 may transmit a frame (or packet) 532 to electronic device 112-1 because frame 528 may include MAC address 530 of gateway access point 110-2 instead of MAC address 534 of gateway access point 110-1. Frame 532 may indicate that MAC address 530 is incorrect or has changed. After receiving frame 532, interface circuit 508 may transmit an ARP request 536 to gateway access point 110-1 with IP address 524. In response, interface circuit 514 may transmit an ARP response 538 with MAC address 534. Based on ARP response 538, electronic device 112-1 may store MAC address 534 and/or IP address 524 in an ARP cache.

Alternatively, when gateway access point 110-1 assumes IP address 524, interface circuit 514 may transmit a gratuitous ARP packet 540 to subnet 114 (FIG. 1), so that electronic device 112-1 can store MAC address 534 and/or the IP address 524 in the ARP cache.

Then, interface circuit 508 may include MAC address 534 and/or IP address 524 in transmitted frames or packets, as well as the destination MAC address and/or IP address. Moreover, gateway access point 110-1 may handle processing of these frames or packets, such as routing them to their destination(s).

Note that, if gateway access point 110-2 is subsequently active again, this process may be revered. In particular, if interface circuit 514 receives a gratuitous ARP packet 542 from gateway access point 110-2 and provides alert 544 to processor 520, processor 520 may instruct 546 interface circuit 514 to no longer assume IP address 524. Instead, gateway access point 110-2 may once again assume IP address 524.

Next, interface circuit 508 may transmit a frame (or packet) 548 to IP address 524 (and, thus, to gateway access point 110-2). After receiving frame 548, interface circuit 510 may transmit a frame (or packet) 550 to electronic device 112-1 because frame 548 may include MAC address 534 of gateway access point 110-1 instead of MAC address 530 of gateway access point 110-2. Therefore, frame 550 may indicate that MAC address 534 is incorrect or has changed. Moreover, after receiving frame 550, interface circuit 508 may transmit an ARP request 552 to gateway access point 110-2 with IP address 524. In response, gateway access point 110-2 may transmit an ARP response 554 with MAC address 530 of gateway access point 110-2. Based on ARP response 554, electronic device 112-1 may store MAC address 530 and/or IP address 524 in the ARP cache.

Alternatively, when gateway access point 110-2 reassumes IP address 524, interface circuit 510 may transmit a gratuitous ARP packet 556 to subnet 114 (FIG. 1), so that electronic device 112-1 can store MAC address 530 and/or the IP address 524 in the ARP cache.

Furthermore, interface circuit 508 may include MAC address 530 and/or IP address 524 in transmitted frames or packets, as well as the destination MAC address and/or IP address. Additionally, gateway access point 110-2 may once again handle processing of these frames or packets, such as routing them to their destination(s).

We now describe embodiments of an electronic device, which may perform at least some of the operations in the communication technique. FIG. 6 presents a block diagram illustrating an electronic device 600 in accordance with some embodiments, such as one of access points 110 or electronic devices 112. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as nodes 608, e.g., a pad, which can be coupled to the one or more antennas 620. Thus, electronic device 600 may or may not include the one or more antennas 620.) For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 600 may be adapted or changed using pattern shapers (such as reflectors) in one or more antennas 620 (or antenna elements), which can be independently and selectively electrically coupled to ground to steer the transmit antenna pattern in different directions. Thus, if one or more antennas 620 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 600 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program module 622 is included in operating system 624 and/or control logic 616 is included in interface circuit 618. In some embodiments, the communication technique is implemented using information in layer 2 of the Open System Interconnection model.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) or in firmware in interface circuit 618. Alternatively or additionally, at least some of the operations in the communication technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
an antenna node configured to couple to an antenna; and
an interface circuit, coupled to the antenna node, configured to wirelessly communicate with an electronic device in a subnet, wherein the access point is configured to:
    receive a message that includes a Dynamic Host Configuration Protocol (DHCP) response with an Internet protocol (IP) address of a gateway for the electronic device to access a network that includes the subnet and a media access control (MAC) address of the electronic device;
    determine, based at least in part on the MAC address, a different IP address of another gateway for the electronic device to access the network;
    modify the DHCP response by substituting the IP address of the other gateway for the IP address of gateway in a modified DHCP response; and
    provide the modified DHCP response for the electronic device.

2. The access point of claim 1, wherein the access point determines the IP address of the other gateway using one of: a hash function, and a look-up table.

3. The access point of claim 1, wherein the access point determines the IP address of the other gateway based at least in part on at least a characteristic of the electronic device.

4. The access point of claim 3, wherein the characteristic comprises one of: a capability of the electronic device, a configuration of the electronic device, and an operating system of the electronic device.

5. The access point of claim 1, wherein, prior to determining the IP address of the other gateway, the access point is configured to identify that the message includes the DHCP response.

6. The access point of claim 1, wherein the access point provides the link aggregation without associating one of the gateway and the other gateway to a virtual local area network (VLAN).

7. The access point of claim 1, wherein the access point is further configured to provide redundancy coverage by performing operations comprising:
receiving gratuitous Address Resolution Protocol (ARP) packets associated with another access point, which is a gateway in the subnet, and for which the access point provides preassigned redundancy coverage;
when the access point does not receive a gratuitous ARP packet associated with the other access point within a time interval, assuming an IP address of the other access point, which is in addition to an existing IP address of the access point;
receiving an ARP request associated with the electronic device that includes the IP address of the other access point; and
providing an ARP response to the ARP packet with a MAC address of the access point, so that subsequent frames associated with the electronic device are directed to the access point instead of the other access point.

8. The access point of claim 1, wherein the access point comprises:
a processor; and
memory, coupled to the processor, which stores program instructions, wherein, when executed by the processor, the program instructions causes the access point to perform at least some of the operations in the link aggregation.

9. A non-transitory computer-readable storage medium for use in conjunction with an access point, the computer-readable storage medium storing program instructions that, when executed by the access point, cause the access point to perform link aggregation by performing operations comprising:
receiving a message that includes a Dynamic Host Configuration Protocol (DHCP) response with an Internet protocol (IP) address of a gateway for an electronic device to access a network that includes a subnet with the electronic device and a media access control (MAC) address of the electronic device;
determining, based at least in part on the MAC address, a different IP address of another gateway for the electronic device to access the network;
modifying the DHCP response by substituting the IP address of the other gateway for the IP address of gateway in a modified DHCP response; and
providing the modified DHCP response for the electronic device.

10. The computer-readable storage medium of claim 9, wherein the access point determines the IP address of the other gateway using one of: a hash function, and a look-up table.

11. The computer-readable storage medium of claim 9, wherein the access point determines the IP address of the other gateway based at least in part on at least a characteristic of the electronic device.

12. The computer-readable storage medium of claim 11, wherein the characteristic comprises one of: a capability of the electronic device, a configuration of the electronic device and an operating system of the electronic device.

13. The computer-readable storage medium of claim 9, wherein, when executed by the access point and prior to determining the IP address of the other gateway, the program instructions cause the access point to identify that the message includes the DHCP response.

14. The computer-readable storage medium of claim 9, wherein the access point provides the link aggregation without associating one of the gateway and the other gateway to a virtual local area network (VLAN).

15. The computer-readable storage medium of claim 9, wherein, when executed by the access point, the program instructions cause the access point to provide redundancy coverage by performing operations comprising:
receiving gratuitous Address Resolution Protocol (ARP) packets associated with another access point, which is a gateway in the subnet, and for which the access point provides preassigned redundancy coverage;
when the access point does not receive a gratuitous ARP packet associated with the other access point within a time interval, assuming an IP address of the other access point, which is in addition to an existing IP address of the access point;
receiving an ARP request associated with the electronic device that includes the IP address of the other access point; and
providing an ARP response to the ARP request with a MAC address of the access point, so that subsequent frames associated with the electronic device are directed to the access point instead of the other access point.

16. A method for performing link aggregation, comprising:
by an access point:
receiving a message that includes a Dynamic Host Configuration Protocol (DHCP) response with an Internet protocol (IP) address of a gateway for an electronic device to access a network that includes a subnet with the electronic device and a media access control (MAC) address of the electronic device;
determining, based at least in part on the MAC address, a different IP address of another gateway for the electronic device to access the network;
modifying the DHCP response by substituting the IP address of the other gateway for the IP address of gateway in a modified DHCP response; and
providing the modified DHCP response for the electronic device.

17. The method of claim 16, wherein the access point determines the IP address of the other gateway using one of: a hash function, and a look-up table.

18. The method of claim 16, wherein the access point determines the IP address of the other gateway based at least in part on at least a characteristic of the electronic device; and wherein the characteristic comprises one of: a capability of the electronic device, a configuration of the electronic device, and an operating system of the electronic device.

19. The method of claim 16, wherein, prior to determining the IP address of the other gateway, the method further comprises identifying that the message includes the DHCP response.

20. The method of claim 16, wherein the method further comprises:
  receiving gratuitous Address Resolution Protocol (ARP) packets associated with another access point, which is a gateway in the subnet, and for which the access point provides preassigned redundancy coverage;
  when the access point does not receive a gratuitous ARP packet associated with the other access point within a time interval, assuming an IP address of the other access point, which is in addition to an existing IP address of the access point; and
  receiving an ARP request associated with the electronic device that includes the IP address of the other access point; and
  providing an ARP response to the ARP request with a MAC address of the access point, so that subsequent frames associated with the electronic device are directed to the access point instead of the other access point.

* * * * *